(12) United States Patent
Golas

(10) Patent No.: US 10,489,204 B2
(45) Date of Patent: Nov. 26, 2019

(54) FLEXIBLE IN-ORDER AND OUT-OF-ORDER RESOURCE ALLOCATION

(71) Applicant: Samsung Electronics, Co. Ltd., Suwon si, Gyeonggi-Do (KR)

(72) Inventor: Abhinav Golas, Mountain View, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 61 days.

(21) Appl. No.: 15/421,279

(22) Filed: Jan. 31, 2017

(65) Prior Publication Data
US 2018/0217868 A1    Aug. 2, 2018

(51) Int. Cl.
*G06F 9/46*    (2006.01)
*G06F 9/50*    (2006.01)

(52) U.S. Cl.
CPC .......... *G06F 9/5022* (2013.01); *G06F 9/5016* (2013.01)

(58) Field of Classification Search
CPC .............................. G06F 9/5022; G06F 9/5016
See application file for complete search history.

(56) References Cited

U.S. PATENT DOCUMENTS

| | | | |
|---|---|---|---|
| 7,937,561 B2 | 5/2011 | Col et al. | |
| 8,411,584 B1* | 4/2013 | Ding | G06F 15/16 370/252 |
| 8,533,244 B2 | 9/2013 | Ramanujam | |
| 8,601,086 B2 | 12/2013 | Pandya | |
| 8,612,955 B2 | 12/2013 | Oskin et al. | |
| 8,769,539 B2 | 7/2014 | Hopper et al. | |
| 9,256,497 B2 | 2/2016 | Khartikov et al. | |
| 9,274,971 B2 | 3/2016 | Fleischer et al. | |
| 9,304,924 B2 | 4/2016 | Lih et al. | |
| 9,369,236 B2 | 6/2016 | Kwon et al. | |
| 9,448,779 B2 | 9/2016 | Grover et al. | |
| 9,876,865 B1* | 1/2018 | Skalecki | H04L 67/16 |
| 10,102,046 B2* | 10/2018 | Weld | G06F 11/0718 |
| 2007/0230477 A1* | 10/2007 | Worley | G06F 9/5016 370/395.3 |
| 2013/0346730 A1* | 12/2013 | Kiyota | G06F 12/0875 712/221 |
| 2014/0013132 A1 | 1/2014 | de Rochemont et al. | |
| 2014/0195772 A1 | 7/2014 | McCormick, Jr. | |
| 2014/0325506 A1* | 10/2014 | Callahan, III | G06F 9/448 718/1 |
| 2015/0106805 A1* | 4/2015 | Melander | G06F 9/45537 718/1 |

(Continued)

*Primary Examiner* — Camquy Truong
(74) *Attorney, Agent, or Firm* — Innovation Counsel LLP

(57) ABSTRACT

A system includes a plurality of hardware resources, one or more processors configured to execute one or more programs to perform one or more operations; and a resource allocator configured to implement resource allocation of the plurality of hardware resources to a set of hardware threads. The resource allocation of the plurality of hardware resources is performed by: implementing a linked list comprising a plurality of nodes, wherein each of the plurality of nodes includes respective information regarding at least one of a next node or a previous node; allocating in a first order one or more ranges of free resources of the plurality of hardware resources to one or more nodes of the plurality of nodes; and releasing allocated nodes out-of-order in a second order distinct from the first order.

17 Claims, 6 Drawing Sheets

(56) References Cited

U.S. PATENT DOCUMENTS

| | | |
|---|---|---|
| 2015/0234745 A1 | 8/2015 | Roy et al. |
| 2015/0277916 A1 | 10/2015 | Khartikov et al. |
| 2015/0278097 A1 | 10/2015 | Kelm et al. |
| 2015/0378731 A1 | 12/2015 | Lai et al. |
| 2016/0099889 A1* | 4/2016 | Yuan ............... H04L 47/822 709/226 |
| 2016/0203068 A1 | 7/2016 | Rajwar et al. |
| 2016/0267621 A1 | 9/2016 | Liao et al. |
| 2016/0285722 A1 | 9/2016 | Min et al. |

* cited by examiner

FLEXIBLE IN-ORDER AND OUT-OF-ORDER RESOURCE ALLOCATION

TECHNICAL FIELD

The present application relates generally to computer systems and, more specifically, to a system and method for out-of-order resource allocation.

BACKGROUND

Graphics processing units (GPUs) are widely used in computer systems for manipulating computer graphics and even for general-purpose computation. Many of these computer systems have to manage highly restricted hardware resources that are impacted by register allocation design. In these systems, in-order allocators, such as ring allocators, are sometimes used for resource allocation, owing to their simplicity. Some GPUs run multiple kinds of shaders in parallel for graphics and compute pipelines. In addition, multiple different shaders of each type may be active at any time. For these conditions, in-order allocators may not be the most efficient way to allocate resources.

SUMMARY

A system is provided. The system includes a plurality of hardware resources, one or more processors configured to execute one or more programs to perform one or more operations; and a resource allocator configured to implement resource allocation of the plurality of hardware resources to a set of hardware threads. The resource allocation of the plurality of hardware resources is performed by: implementing a linked list comprising a plurality of nodes, wherein each of the plurality of nodes includes respective information regarding at least one of a next node or a previous node; allocating in a first order one or more ranges of free resources of the plurality of hardware resources to one or more nodes of the plurality of nodes; and releasing allocated nodes out-of-order in a second order distinct from the first order.

A method is provided. The method includes implementing, in a system comprising a plurality of hardware resources and one or more processors configured to execute one or more programs to perform one or more operations, a linked list comprising a plurality of nodes. Each of the plurality of nodes includes respective information regarding at least one next node or a previous node The method also includes allocating in a first order one or more ranges of free resources of the plurality of hardware resources to one or more nodes of the plurality of nodes. The method also includes releasing allocated nodes out-of-order in a second order distinct from the first order.

A non-transitory computer readable medium is provided. The non-transitory computer readable medium includes a plurality of instructions that, when executed by one or more processors, is configured to cause the one or more processors to implement resource allocation of a plurality of hardware resources to the one or more processors by: implementing a linked list comprising a plurality of nodes, wherein each of the plurality of nodes includes respective information regarding at least one of a next node or a previous node; allocating in a first order one or more ranges of free resources of the plurality of hardware resources to one or more nodes of the plurality of nodes; releasing allocated nodes out-of-order in a second order distinct from the first order.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
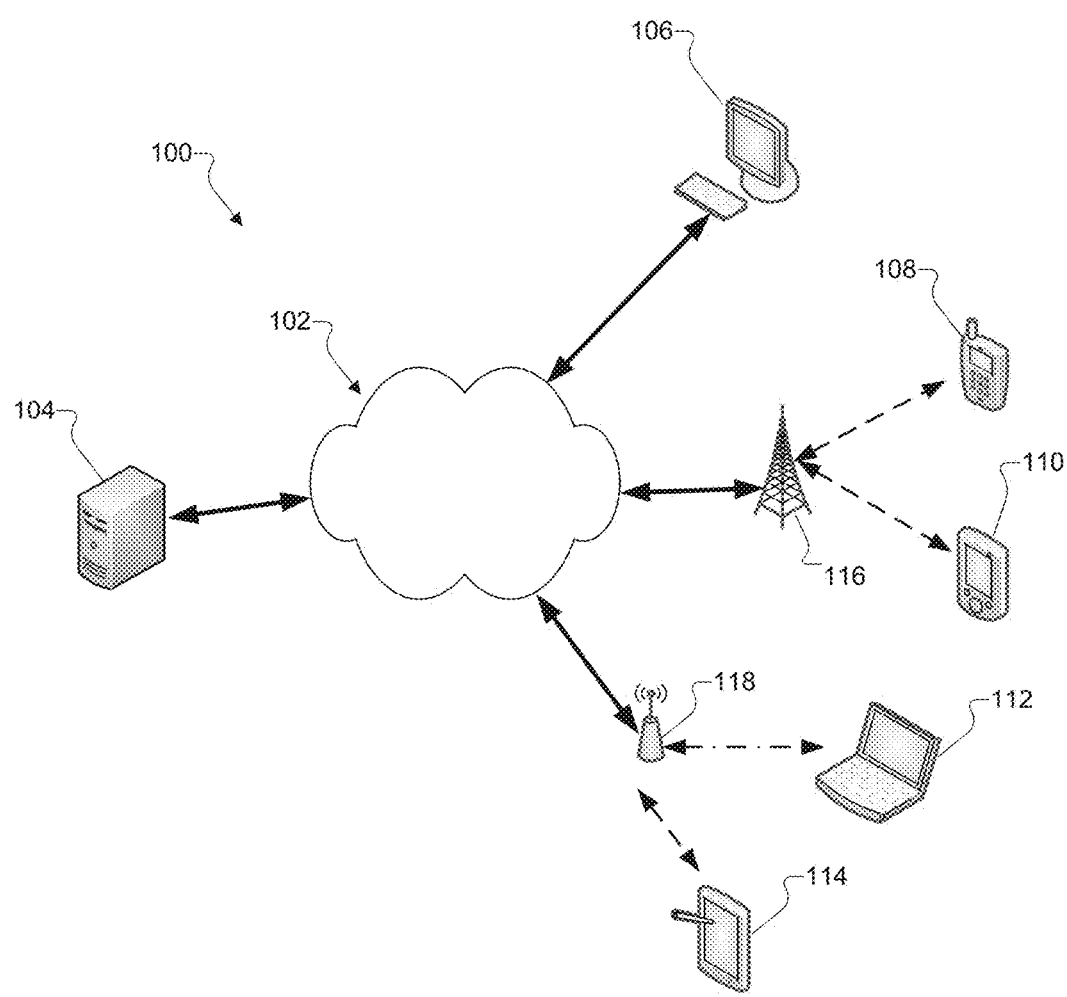
FIG. 1 illustrates an example computing system according to this disclosure.

FIGS. 1 through 7, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

One of the key problems on Graphics Processing Units (GPUs) is resource allocation on the programmable parts (programmable hardware) of the GPUs—called the ALU (Arithmetic Logic Unit) in computer architecture textbooks, and referred herein as Processing Elements (PEs). PEs may offer many operations in addition to basic arithmetic operations, like memory loads/stores, conditional statements like if-then-else, and jump statements like goto, and so forth. In order to enable parallel computation in keeping with modern APIs, PEs also include finite storage of varying throughput, latency, and access characteristics. These include registers as the fastest, global memory/private memory as the slowest, along with shared/local memory in the middle which also allows interaction across threads. Lastly, PEs also offer some synchronization primitives like barriers and fences to enable modern parallel programs. All such kinds of storage and other primitives require efficient allocation owing to the fact that they are finite in nature and not statically partitioned between sets of hardware threads so as to allow for optimal usage based on demand.

These resources include, but are not limited to: 1) warps, or an entity describing a set of threads running a single piece of shader code, wherein a PE may run multiple warps in parallel, or may switch between them at an unknown or arbitrary granularity—for example switching after an unknown or arbitrary number of instructions based on some set of rules; 2) Various kinds of Registers, or high-speed memory used to store working set data accessed by warps; 3) Shared/Local Memory, a local scratch space that may be used by threads within or across warps to collectively perform some computation (although the shared/local memory may be emulated by global memory, some APIs, such as OpenCL, require the shared/local memory and thus are commonly implemented as a dedicated piece of hardware); and Other finite resources which vary across GPUs. The unifying characteristics for these resources are that: they are finite, but their number may be high; and allocation granularity for these resources may be greater than 1, namely subsets of these resources may be allocated in one request.

For such resource allocation, the commonly used approach in hardware is to use a simple in-order allocator like a ring allocator. These are preferred since they are simple to implement and debug, and have a highly predictable behavior which is known intuitively to designers. Such in-order allocators work well when the nature and lifetime of work is uniform or nearly the same across multiple warps. However, newer GPUs must run multiple kinds of shaders in parallel for graphics and compute pipelines. In addition, multiple different shaders of each type may be active at any time, creating a wide variety of warps active on a PE. This means that in-order allocators may be inefficient and artificially starve the PE; that is, disallowing warps to execute that should be able to run but cannot due to the resource not being in the allocatable region.

This can be illustrated using a ring allocator, which looks at any resource as a ring, allocating at a head, and releasing from a tail—thus allocation and release are both in-order. For example, when 2 warps are allocated, the warps are allocated 0 and 1 in that order, followed by a request for a 3rd warp. When all available PE resources are consumed by warps 0 and 1, warp 1 completes before warp 0, and the resource requirement for warp 2 is a subset of the requirement of warp 0 and 1 individually, when warp 1 completes and warp 0 is still running, warp 2 cannot be allocated by an in-order allocator since resources for warp 1 can only be released after resources for warp 0. That is, in this example, since warp 1 was allocated after warp 0, warp 0 must be release first and warp 1 cannot be released prior to warp 0.

Such a scenario may implement out-of-order allocation for improved performance. For resources like warp slots, where it is only necessary to allocate and release 1 resource at a time—that resource being the slot itself, and not associated resources like registers and shared memory—creating an out-of-order allocator may involve keeping a valid-bit per slot, set to 1 if the warp is allocated and has not completed yet, 0 otherwise. An allocator with this works by finding any (commonly the first) slot whose valid bit is 0, while a release logic is even simpler as it simply sets the appropriate valid bit to 0.

For resources like registers and shared memory, the situation may be more complex. For example, it may be more efficient for PE implementations to allocate continuous ranges of register and shared memory to a single warp—as addressing within it can then be implemented as a simple (base+offset), as opposed to using a table for remapping addresses. Allocating continuous ranges of resources with the above design is complex.

In addition, in-order allocators, like ring-allocators, must also release resource in the correct serial order. Therefore, release requests must also be re-ordered before they can be serviced.

Embodiments of the present disclosure address the problems stated herein above. The embodiments can be extended to service other allocation scenarios as well. That is, certain embodiments provide for out-of-order allocation thus minimizing fragmentation and allowing resource reuse as soon as possible. Certain embodiments also avoid a use of remapping tables.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100. Additionally, one or more of the client devices 106-114 may represent a standalone device that does not communicate with or through the network 102.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, one or more servers 104 or client devices 106-114 include a plurality of hardware resources for use by one or more hardware processes (e.g., one or more sets of threads, such as GPU warps or wavefronts) of one or more processing elements (PE) (e.g., CPUs, GPUs, or other hardware components for processing). Any of the devise, namely the servers 104 or client devices 106-114, can include a resource allocator capable of implementing resource allocation of the plurality of hardware resources to the one or more processing elements by: implementing a linked list comprising a plurality of nodes, wherein each of the plurality of nodes includes respective information regarding at least one of a next node or a previous node; allocating in a first order one or more ranges of free resources of the plurality of hardware resources to one or more nodes of the plurality of nodes; and releasing allocated nodes out-of-order in a second order distinct from the first order.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
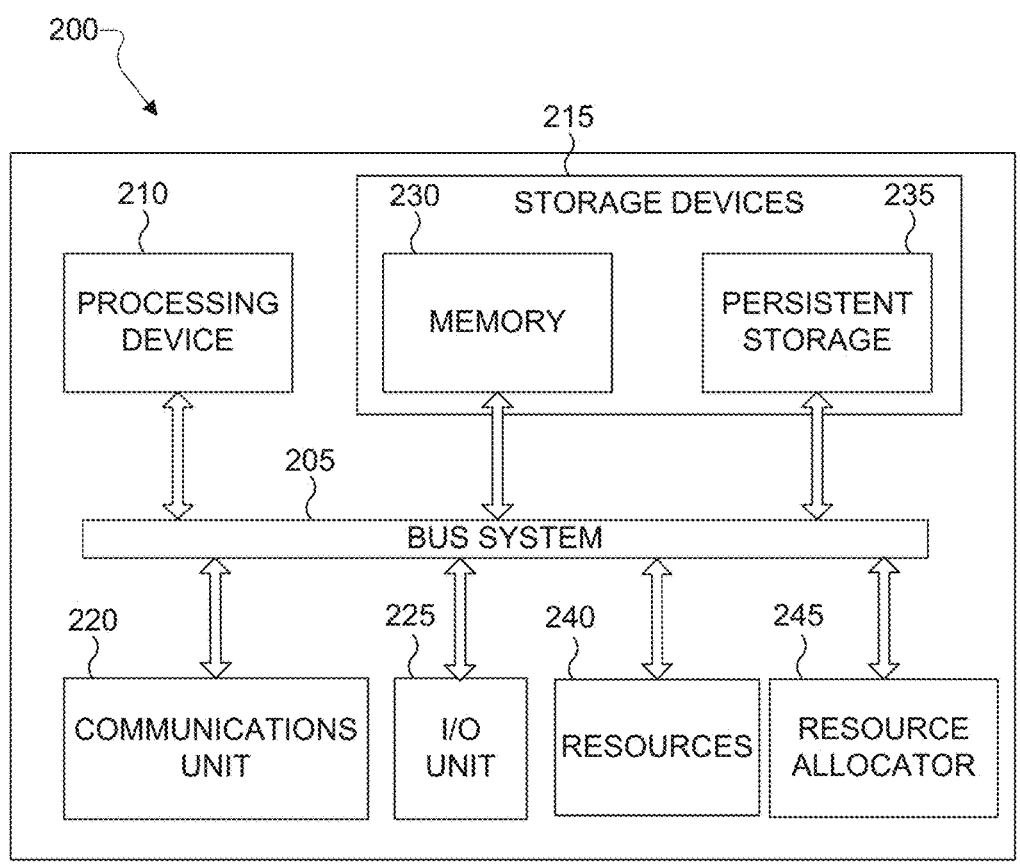
FIGS. 2 and 3 illustrate example devices in a computing system according to this disclosure.
Figure 3:
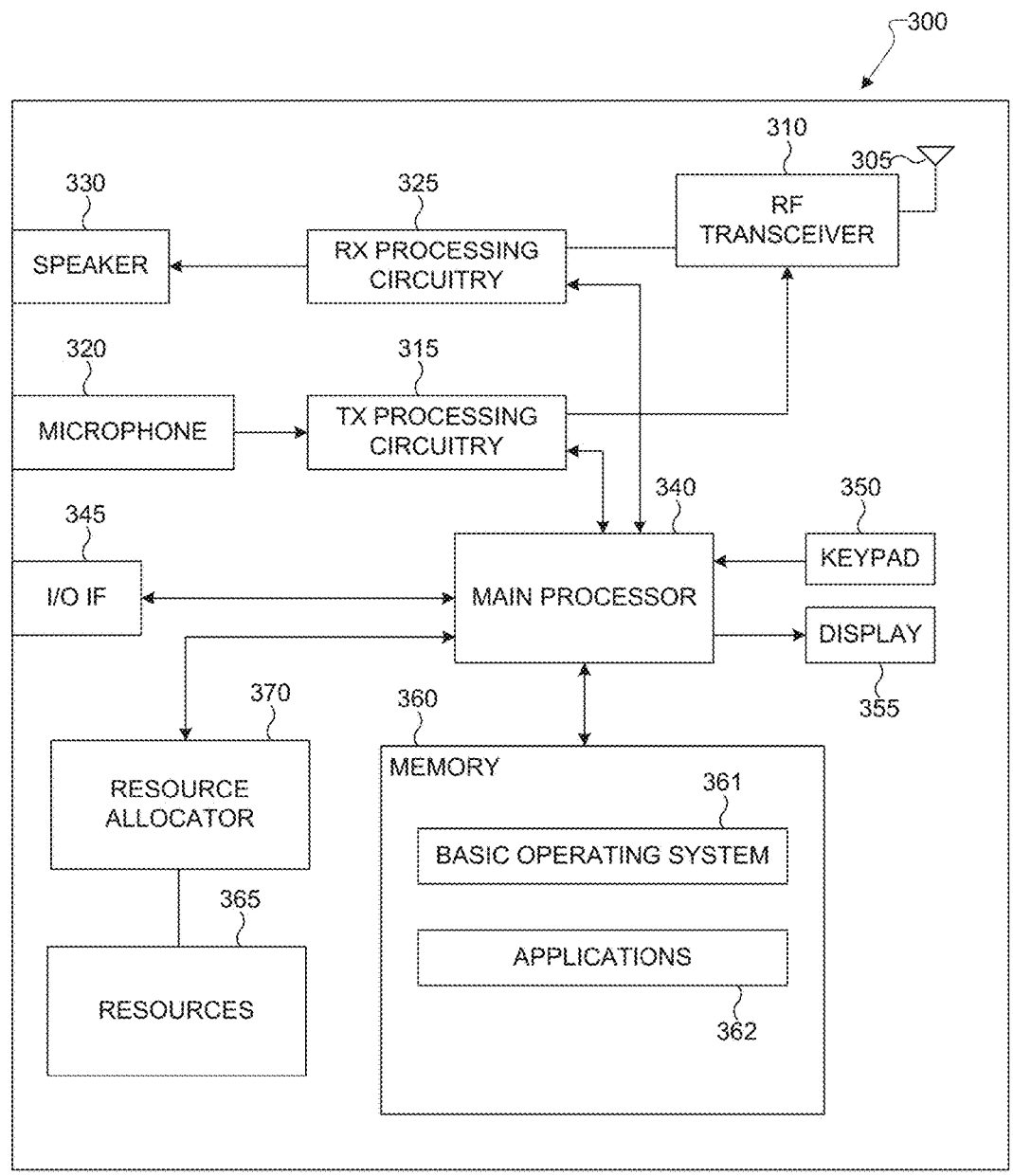

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205. The bus system 205 supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry. In certain embodiments, the processing device 210 includes one or more processors configured as graphic processing units (GPUs) configured to execute processing threads, also referred to as warps.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In certain embodiments, the server 200 includes a plurality of hardware resources 240. The hardware resources 240 include computational resources such as:

programmable processors, texture units or circuits, or framebuffers.

warps, or an entity describing a set of threads running a single piece of shader code. A PE may run multiple warps in parallel, or may switch between them at an unknown or arbitrary granularity—for example switching after an unknown or arbitrary number of instructions based on some set of rules.

Various kinds of Registers, or high-speed memory used to store working set data accessed by warps.

Shared/Local Memory, a local scratch space that may be used by threads within or across warps to collectively perform some computation. Although the shared/local memory may be emulated by global memory, some APIs, such as OpenCL, require the shared/local memory and thus are commonly implemented as a dedicated piece of hardware.

Other finite resources which vary across GPUs.

The unifying characteristics for these resources are that:

They are finite, but their number may be high

Allocation granularity for these resources may be greater than 1, namely, subsets of these resources may be allocated in one request In certain embodiments, the server 200 includes a resource allocator 245. The resource allocator 245 can include processing circuitry configured to allocate the plurality of resources to one or more processes (e.g., GPU warps). The processing circuitry can include one or more processors configured to perform allocation or one or more processors configured to execute a plurality of instructions, such as stored in memory 230, configured to enable to one or more processors to perform resource allocation of the plurality of hardware resources to the one or more processors by: implementing a linked list comprising a plurality of nodes, wherein each of the plurality of nodes includes respective information regarding at least one of a next node or a previous node; allocating in a first order one or more ranges of free resources of the plurality of hardware resources to one or more nodes of the plurality of nodes; and releasing allocated nodes out-of-order in a second order distinct from the first order.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a main processor 340, an input/output (I/O) interface (IF) 345, a keypad 350, a display 355, and a memory 360. The memory 360 includes a basic operating system (OS) program 361 and one or more applications 362. Although the example shown in FIG. 3 illustrates the antenna 305, the radio frequency (RF) transceiver 310, transmit (TX) processing circuitry 315, the microphone 320, and receive (RX) processing circuitry 325, in certain embodiments, the client device 300 does not include one or more of these elements.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the client device 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from external devices or an operator. The main processor 340 is also coupled to the I/O interface 345, which provides the client device 300 with the ability to connect to other devices such as laptop computers and handheld computers. The I/O interface 345 is the communication path between these accessories and the main controller 340.

The main processor 340 is also coupled to the keypad 350 and the display unit 355. The operator of the client device 300 can use the keypad 350 to enter data into the client device 300. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

In certain embodiments, the client device 300 includes a plurality of hardware resources 365. The hardware resources 365 include one or more of the hardware resources 240.

In certain embodiments, the client device 300 includes a resource allocator 370. The resource allocator 370 can include processing circuitry configured to allocate the plurality of resources to one or more processes (e.g., GPU warps). The processing circuitry can include one or more processors configured to perform allocation or one or more processors configured to execute a plurality of instructions, such as stored in memory 360, configured to enable to one or more processors to perform resource allocation of the plurality of hardware resources to the one or more processors by: implementing a linked list comprising a plurality of nodes, wherein each of the plurality of nodes includes respective information regarding at least one of a next node or a previous node; allocating in a first order one or more ranges of free resources of the plurality of hardware resources to one or more nodes of the plurality of nodes; and releasing allocated nodes out-of-order in a second order distinct from the first order.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). As a particular example, the main processor 340 could be a GPU including a plurality of fixed-function and programmable hardware. Some examples of fixed-function hardware are texture units accessing image data and interpolating on demand, or rasterizers creating pixel coverage of geometric primitives. Programmable hardware includes Arithmetic Logic Units (ALUs) called PEs in this context. While programmable components allow the GPU to be general purpose, yet efficient for large parallel workloads like shading, fixed-function units allow the GPU to specialize specific operations that benefit for a dedicated hardware implementation. Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

A resource allocator, such as resource allocator 245 or resource allocator 370, is configured to perform resource allocation of resources on the one or more processors to one or more hardware threads (e.g., sets of threads being executed by one or more processors, such as GPU warps). The resource allocator can function in both in-order and out-of-order modes with hardware implementation. The resource allocator generalizes a ring buffer by considering it as a linked list—an allocation head, which is a point within the resource range that is a starting point for any allocation request received, marking the end of the 'valid' range, with the release head (or tail) marking the beginning of the 'valid' range, where valid is defined as that resource being in-use.

The resource allocator implements a ring buffer or linked list as a doubly-linked list in which each node includes information regarding a next allocation and a previous allocation. Each allocation node includes a contiguous range of resources. The resource allocator uses the information of the linked list specifying a next and/or previous node for the plurality of nodes to allocate nodes and release allocated nodes. The resource allocator allocates nodes in a first order to contiguous ranges of free resources and is able to release nodes out-of-order, such as in a second order distinct from the first order. For example, a resource can be defined as a ring—with an index going from 0 . . . k, where k is commonly 2N−1. Implementing a ring means that (k+1) wraps around to index 0. An allocation is the assignment of resources i . . . j to a particular warp/thread. This allocation is a range of resources. Each node in the allocator points to one such range. Allocation requests are received over time in a particular order. The most common allocation order is to assign resources in the same order as is received. This is commonly referred to as an in-order allocation. When the warp to which these resources are assigned completes, the resources are freed as well. In-order release implies that even if warps complete in an order different from the one in which they were allocated, the associated resources would release in the same order as the allocation. An out-of-order release implies that the warp completing out-of-order is processed as the completion occurs. The released resources may or may not be "freed" immediately, where freed implies they are available to be allocated to another warp. The allocation head is a point within the resource range 0 . . . k that is a legal starting point for any allocation request received. Each allocation head also includes a 'size', namely the number of resources available starting from this legal starting point. At init (that is, the beginning of execution), an allocation head starting at M must exist, where M is commonly 0 or the like. In-order allocators maintain one and only one allocation head, whose starting location only increases with each allocation. At the end of the range, the starting location pointed to by an allocation head wraps around to 0. According to certain embodiments of the present disclosure, out-of-order allocators are able to maintain one or more allocation heads. Embodiments of the present disclosure also allow the legal starting position of the head to move in ways other than just increasing—reassignment to any legal position in the valid range is possible in some cases.

Figure 4:
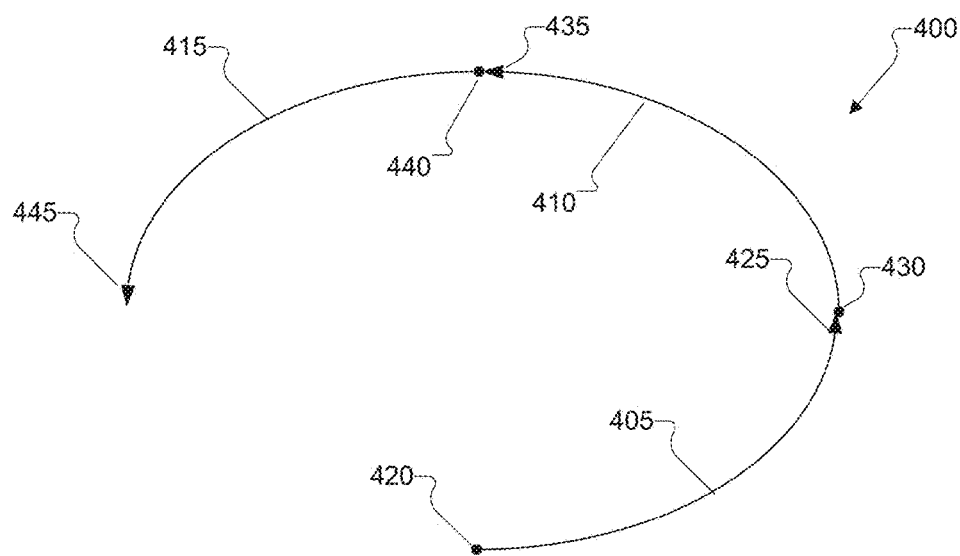
FIG. 4 illustrates a ring buffer allocation according to embodiments of the present disclosure.

FIG. 4 illustrates a ring buffer allocation according to embodiments of the present disclosure. The embodiment of the ring buffer 400 shown in FIG. 4 is for illustration only and other embodiments, configurations or illustrations can be used without departing from the scope of the present disclosure.

A simple ring-buffer can be conceptualized as a cyclical singly-linked list, where each allocation is a node in the list. Some nodes are allocations corresponding to a range of allocated resources—as a range tuple (start, end) or (start, size)—and whose next allocation (node) is known via a 'next' pointer. Free resource ranges are a single node (or multiple nodes) in the linked list, pointed to by the 'head' pointer(s) (allocate from), whereas the 'tail' pointer(s) (release from) point to a node after this node, which contains the oldest allocation.

As shown in the Example shown in FIG. 4, the ring buffer 400 includes three allocations 405, 410, 415. Two nodes are allocated resources. The nodes are allocated node 405 and node 410 in that order, followed by a 3rd node 415. Node 405 includes start 420 and an end 425 with a plurality of contiguous resources therebetween. Node 410 includes start 430 and an end 435 with a plurality of contiguous resources therebetween. Node 415 includes a start 440 and an end 445 with a plurality of contiguous resources therebetween. Each node includes a range of contiguous resources. For example, Node 405 can include resources i-j, Node 410 can include resources k-m and node 415 can include resources a-f. Although each node includes a contiguous range of resources, the resources across Node 405, Node 410 and Node 15 are not necessarily contiguous. The resources need not be contiguous, if they are j=k and m=a.

Embodiments of the present disclosure consider a doubly-linked list as the underlying conceptual container, namely, each allocation includes information regarding next and previous allocations. The resource allocator uses the information of the linked list specifying a next and/or previous node for the plurality of nodes to allocate nodes and release allocated nodes. This is achieved by allowing more than 1 range (node) of free resources. Thus, the resource allocator tries to release resources into one of these free ranges if they are adjacent to it, that is, if they are the next or previous nodes. Otherwise, the resource allocator merges the resources into the next oldest allocation adjacent to the released node. The resource allocator can perform allocations from any of the free resource nodes. For example, Node 405 is an initial node (Node-0) with allocation head 420 and Node 410 being a next node. When looking at Node 410 (Node-1), Node 405 is a previous node and node 415 is a next node. When looking at Node 415 (Node-2), Node 410 is a previous node and a next allocation is empty. In the example shown in FIG. 4, Node 405 is the oldest allocation.

When Node 410 completes before node 405, and a requested resource requirement for another warp is received, the resource allocator can release node 410 and allocate resources to allocation head 430. That is, the resource allocator can give to the resources for node 410 to the next allocation. Additionally, the resource allocator is configured to select an allocation head based on a request for resources and a prioritization, namely a heuristic or algorithm. For example, when the prioritization function comprises a greedy heuristic, the resource allocator selects the allocation head that has a maximum amount of contiguous resources; when the prioritization function comprises a best match prioritization, the resource allocator selects the allocation head that has a minimum amount of resources to allocate; and when the prioritization function comprises a difference prioritization, the resource allocator selects an allocation head having an available range of contiguous resources within a predefined margin of an amount of resources requested. Additionally, the allocator can select a first range, from the one or more contiguous ranges of free resources, to allocate to a first node of the one or more nodes based on a request for resources, which can include being based on a metadata of the request. The metadata can include information regarding the shader code, shader type some information about the particular code/program, and execution characteristics such as any methods to predict how long a shader program is likely to last, and the like. For example, an implementation may choose to allocate all warps of a particular shader from a specific allocation head.

Accordingly, in certain embodiments, the resource allocator is configured to allocate resources in a first order, such as by allocating resources to Node 405, then to Node 410 and then to Node 415. Thereafter, in response to receiving a release request, such as when a warp completes, the resource allocator is free to release resource in a second order different from the first order, such as by release resource from Node 410 prior to releasing resources from Node 405; or releasing resource from Node 415 prior to release resource from Node 410 or Node-J 405.

In some embodiments, in-order allocation behavior can still be enforced by restricting the number of free nodes to 1, and disallowing the creation of new free nodes. In doing so, the resource allocator is able to releases resources out-of-order, thus no need exists for the resource allocator to reorder release requests, as resources freed will simply be added to the next oldest allocation adjacent to the node. Thus, even though a release is processed out-of-order, the resource allocator is able to free resources in-order In some embodiments, to prevent fragmentation, two adjacent free nodes are merged on release of resources from those nodes. Any node being freed can be made into a new free node if the number of free nodes is under a defined maximum.

In certain embodiments, the resource allocator is configured to assign all inactive allocations as allocation heads. In certain embodiments, the resource allocator is configured to release nodes out-of-order by remapping the plurality of hardware resources to one of: a previous allocation node; a next allocation node; an allocation head having fewer resources; an empty allocation node, namely an allocation head having no resources; or an oldest neighboring allocation. The resource allocator also can on release, merge released resources with a range of free resources. In certain embodiments the resource allocator uses information regarding the doubly-linked list specifying a next node or previous node for a given node. That is, the resource allocator uses the information of the linked list specifying a next and/or previous node for the plurality of nodes to allocate nodes and release allocated nodes.

Figure 5:
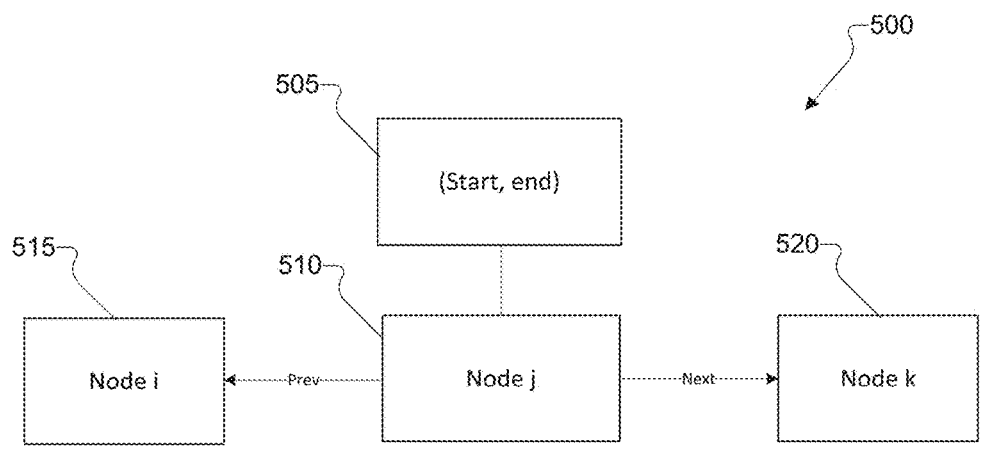
FIG. 5 illustrates a doubly-linked Queue Node according to embodiments of the present disclosure.
Figure 6:
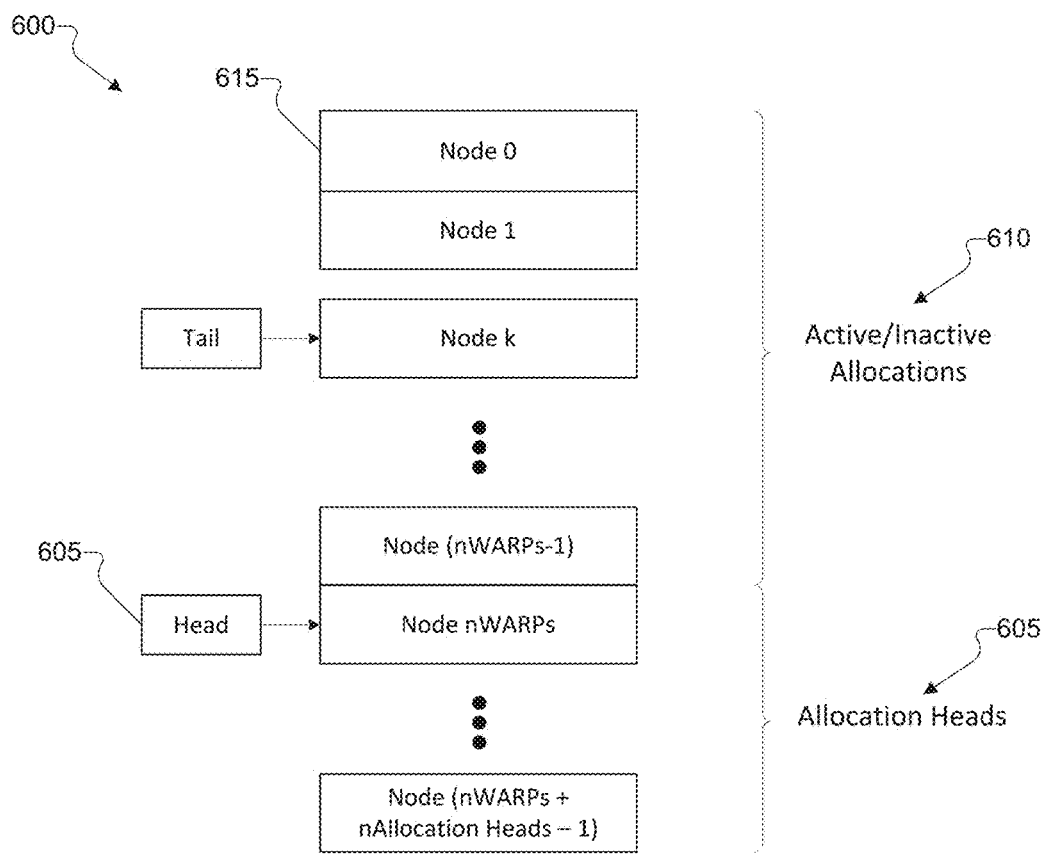
FIG. 6 illustrates an allocation table according to embodiments of the present disclosure.

FIGS. 5 and 6 illustrate a structure of the allocator, with the table of nodes, according to embodiments of the present disclosure. It should be noted that even though nodes have indices for storage convenience, the indices do not imply a next or previous node in the ordering of the doubly linked list. During allocation, the implementation may select any empty node to put the allocation in, possibly using the same valid bit approach described here above. In addition, though head and tail pointers are shown, they are purely for illustrative purposes to match the structure to an in-order ring buffer.

FIG. 5 illustrates a doubly-linked Queue Node according to embodiments of the present disclosure. The embodiment of the doubly-linked Queue Node 500 shown in FIG. 5 is for illustration only. Other embodiments could be used without departing from the scope of the present disclosure.

In certain embodiments, the number of nodes in the linked list is fixed. For example, the linked list includes a maximum number of active allocations and a respective maximum number of allocation heads. That is, in the example of a GPU, programmable hardware usually limits number of active shader warps (or work groups) active on the programmable hardware—these are maximum active allocations. The resource allocator is configured to select a number of allocation heads as a function of a number of allocations.

Allocation proceeds by selecting an inactive node to keep the range of resources being allocated, then finding a node within the allocation heads that contains sufficient resources to service the allocation request, namely, for which the requested resource size is less than the range of resources that the allocation head's (start, end) 505 tuple points to. The selection of an allocation head to allocate from can be performed using a greedy approach, though other embodiments may use different approaches.

The resource allocator also performs a resource allocation release operation. The resource allocator may have received a request for resources or may have determined that another allocation (e.g., GPU warp), has completed. The resource allocator is configured to maximize range length for a free resource set. The resource allocator can free up resources for a few allocated nodes (e.g., warps) and create a largest possible range. As such, resources that are free are made available for allocation again in a shortest amount of time. The resource allocator, such as resource allocator 245 or resource allocator 370, may employ various heuristics to reduce an amount of time in which resource cannot be used again and maximize the length of the range of free resources.

The resource allocator determines that Node-j 510 is ready to be released. For example, the string or process for allocated Node-j 510 may have completed, and therefore the resources allocated to Node-j 510 may be released. The resource allocator determines a start and end/for Node-j 510. The resource allocator also identifies a previous node, Node-i 515, and a next node, Node-k 520. The resource allocator assigns the resources from Node-j 510 to either the previous node, Node-i 515, or the next node, Node-k 520. In certain embodiments, the resource allocator assigns the resources from Node-j 510 to the larger of Node-i 515 or Node-k 520 in order to maximize the length of a next allocation. In certain embodiments, the resource allocator assigns the resources from Node-j 510 to node, either Node-i 515 or Node-k 520, that is likely to end sooner.

Accordingly, the resource allocator is configured to use information in the doubly-linked list to enable constant time allocation and release in the middle of an existing allocation. By using information of previous and next allocations, the resource allocator is able to keep track of resources while having constant time allocation, and release of resources to address a range of resource without disturbing the existing allocations in constant time and without having to search through a number of allocations. Therefore, in some embodiments, the allocations by the resource allocator are allocation nodes with a simple indexing, having information of a previous and next allocation node.

In certain embodiments, the resource allocator is configured to assign a recently released resource to another allocation head. That is, the resource allocator assigns recently released resources to an allocation head that is adjacent to this range, namely, that is conceptually the 'previous' or 'next' node of this node. Merging with another allocation head reduces the amount of time that the resource is blocked to be zero. In certain embodiments, to optimize allocation to another allocation head, the allocation head should be empty or a length of the range of resources in the allocation node is smaller than the length of resource recently released. As such, the resource allocator assigns recently released resources to an allocation head with no free resources within it, or with a range of resources which is shorter than this range. In certain embodiments, resource allocator is configured to increase a range of resources by merging a recently a released resource with resources corresponding to a free allocation head, which has no allocation assigned to it, and when the number of allocation heads is lower than the implementation specified maximum. In certain embodiments, resource allocator assigns recently released resources to an existing allocation that is adjacent to this node—namely, the previous or next nodes. In certain embodiments, the resource allocator assigns recently released resources to an arbitrary node, combined with some reordering of nodes in embodiments that are not restricted to constant time.

Accordingly, in certain embodiments, the resource allocator is configured to allocate resources in a first order, such as by allocating resources to Node-i 515, then to Node-j 510 and then to Node-k 520. Thereafter, in response to receiving a release request, such as when a warp completes, the resource allocator is free to release resource in a second order different from the first order, such as by releasing resource from Node-j 510 prior to releasing resources from Node-i 515; or releasing resource from Node-k 520 prior to release resource from Node-i 515 or Node-J 510.

The resource allocator is able to determine that neither neighboring node is an allocation head. In certain embodiments, the resource allocator determines whether any allocation heads have no resources within them. If the resource allocator identifies one or more allocation heads with no resources, the resource allocator will assign the recently freed resources to one of the allocation heads having no resources therein. If the resource allocator does not identify any allocation heads without resources, the resource allocator then absorbs the freed resources into next oldest adjacent (e.g., previous) allocation.

FIG. 6 illustrates an allocation table according to embodiments of the present disclosure. The embodiment of the allocation table 600 shown in FIG. 6 is for illustration only. Other embodiments could be used without departing from the scope of the present disclosure.

In the example shown in FIG. 6, the number of heads from which you can allocate from, namely allocation heads 605, is fixed. The resource allocator works with a fixed number of nodes, a number defining the maximum number of allocations (warps) nwarps, and a maximum number of free nodes—called allocation heads. Since the number of nodes is fixed, they can be instantiated in hardware as an array stored in a memory indexed by a node index, making for simple implementation. In this array, the first nwarps slots may contain valid allocations, and new allocations may only use resources from the nodes nwarps→nwarps+nAllocationHeads.

The resource allocation makes all the possible allocations 610, active and inactive, into nodes 615 in a doubly-linked list. In this example, the Nodes 615 correspond to respective sets of threads (e.g., warps) to be executed by one or more processors. Here, allocations are nodes at beginning of an array, each node 615 corresponding to a warp. The head 620 of each allocation string points to a neighbor node and the tail 625 points to another neighbor node.

Release of an active node proceeds by receiving a node index, using which the relevant node can be obtained within the table. The allocated resources can be assigned to the next node 520 or previous node 515, with priority given to nodes that are allocation heads. If both nodes are allocation heads, then after the release, both those nodes are merged. If neither node is an allocation head, then one of two scenarios may occur. If one of the allocation heads has no resources within it, that is, the allocation head is 'empty', then the allocation head can point to these resources instead, thereby spawning a new allocation head. If there are no free allocation heads available, then the resources are assigned to the next oldest node—which is likely to be the previous node 515 if valid, else the next node 520.

This approach uses an approximate Least Recently Used (LRU) cache to keep track of those holes and allocate within them if possible, by sorting allocation heads in decreasing size of free ranges represented by the nodes. The number of nodes in this linked list is bounded since the number of warps that can be active on a PE are bounded. This approach uses (nwarps+nAllocationHeads) slots, where nAllocationHeads is the number of active allocation points.

Figure 7:
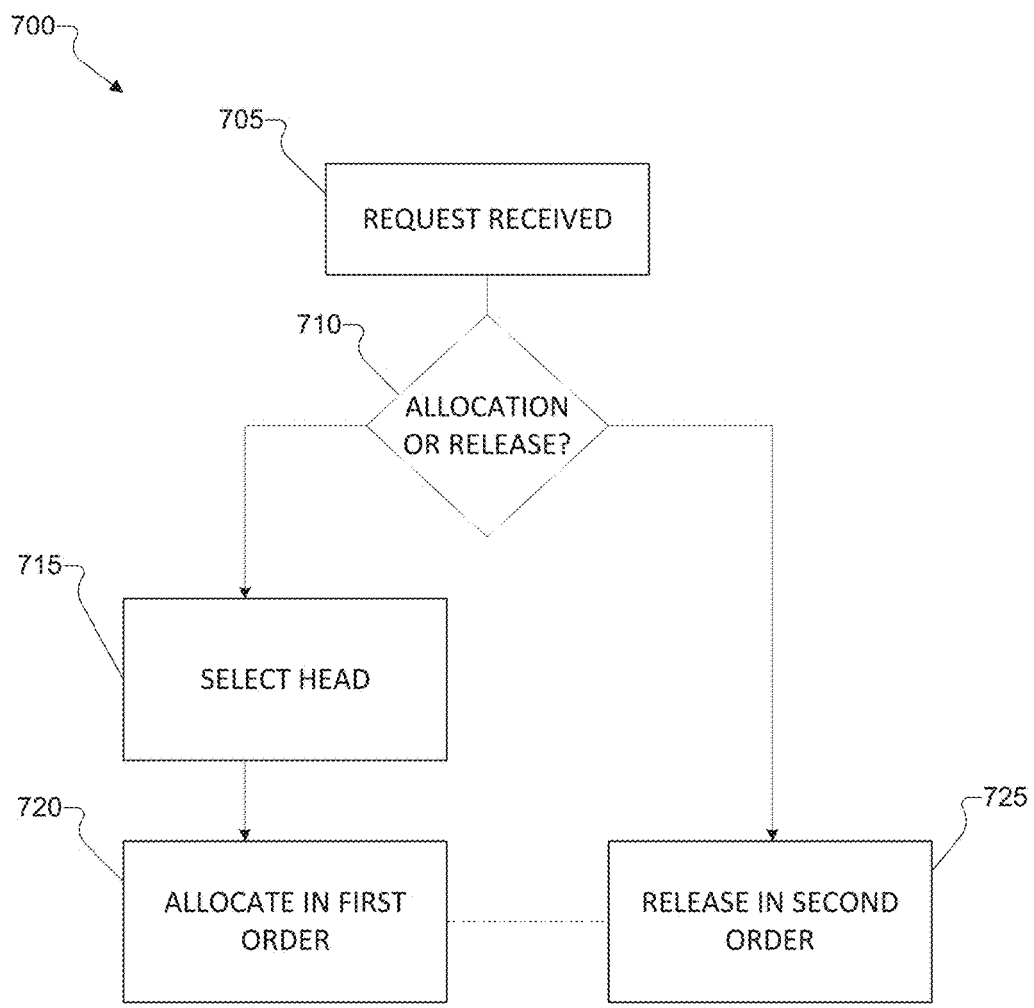
FIG. 7 illustrates an allocation process according to embodiments of the present disclosure.

FIG. 7 illustrates an allocation process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in a computer based device. The process need not be performed in the given order. For example, releasing of resources can occur before, after or concurrently with one or more allocations.

In the allocation process 700, the resource allocator implements a linked list as a doubly-linked list in which each allocation includes information regarding at least one of a next allocation or a previous allocation. The resource allocator can use different approaches to determine to which allocation head a warp request will be assigned. Allocation heads can be sorted by some heap property, such as maximum number of resources. For example, the system may have three allocation heads: a first allocation head corresponding to fifteen registers, a second allocation head corresponding to eight registers and a third allocation corresponding to four registers.

In block 705, the resource allocator receives a request. The request can be a warp request or a request to release resources, in block 710. In the example illustrated, the warp request may be a request for seven registers. The resource allocator may receive multiple warp requests of the same or different sizes. The release request may be for any of the previous allocations to the warp requests.

When the request is a request for resources in block 710, the resource allocator selects a head to allocate from in block 715. In certain embodiments, the resource allocator selects a number of allocation heads based on a maximum number of nodes to which free resources can be allocated, wherein the allocation heads correspond to respective contiguous ranges of free resources of a plurality of hardware resources. The selection of an allocation head to allocate from can be performed using a greedy approach, a best match approach, a differential approach, or any other suitable method. In the greedy approach, the resource allocator selects the allocation head that has a maximum amount of contiguous resources; in the best match prioritization, the resource allocator selects the allocation head that has a minimum amount of resources to allocate; and in the differential approach, the resource allocator selects an allocation head having an available range of contiguous resources within a predefined margin of an amount of resources requested. Additionally, the allocator can select a first range, from the one or more contiguous ranges of free resources, to allocate to a first node of the one or more nodes based on a request for resources, which can include being based on a metadata of the request. The metadata can include, as noted above, shader type, some information about the particular code or program, any methods to predict how long a shader program is likely to run, and the like.

In certain embodiments, the resource allocator uses a greedy approach to pick which head to allocate from in block 715. The resource allocator allocates from head with most resources in block 720. Therefore, the resource allocator allocates from the first allocation having the fifteen registers. The resource allocator performs a constant time node checking to maintain cyclical doubly-linked list.

In certain embodiments, in block 715, when the resource allocator uses a best match approach to pick which head to allocate from, the resource allocator selects an allocation head that has just enough resources to allocate. Therefore, the resource allocator allocates, in block 720, from the second allocation having the eight registers. The best match priority function enables the resource allocator to make a most efficient allocation of resources and leave the larger first allocation having fifteen registers available for a possible larger warp request. The best match priority function may have a high risk of small fragmentation.

The resource allocator allocates nodes in a first order, to contiguous ranges of free resources in block 720. The allocation in the first order defines a sequence or order in which allocations occur. For example, the resource allocator may allocate to Node-0 in response to a first warp (warp-0) request, then Node-1 in response to a second warp (warp-1) request, then Node-2 in response to a third warp (warp-2) request, and so forth.

When the request is a release in block 710, the resource allocator releases nodes out-of-order in block 725, such as in a second order distinct from the first order. It is noted that although discussion of allocation in block 720 precedes discussion of releasing in block 725 and although illustration of blocks 720 and 725 may represent a numerical flow from block 720 to block 725, one or more release operations in block 725 may occur before, concurrent with, or after one or more allocations in block 720. The release of resource in block 720 can occur irrespective of the order in which allocations occurred, namely the first order. For example, after having allocated in the first order to Node-0, then Node-1, then Node-2 and so forth, the resource allocator may release in a second order from Node-1 prior to Node-0 or from Node-2 prior to either Node-0 or Node-1, and so forth. The release of resources in block 720 can occur in response to a release in block 710, which includes a request to release resources, a completion of a warp, and the like. Therefore, upon completion of a warp, the resources allocated to the warp can be released. For example, when warp-1 completes prior to warp-0, the resources allocated to warp-1 are released prior to the resources allocated to warp-0. Additionally, before, after or concurrent with the release of resources for warp-1, the resource allocator can allocate additional resources, in block 710, in response to additional warp requests. On release, resources can be remapped to any empty allocation head if available, remapped to an allocation head having fewer resources, remapped to a largest allocation, remapped to a smallest allocation or remapped to an oldest neighboring allocation (either previous or next). In some embodiments, the second order is the same as the first order. The release order can be based on factors outside of allocator control, such as in response to warps completing at different, specific hardware requests and the like.

On release in block 725, resources can be assigned to other allocation heads. In certain embodiments, resource allocator releases the allocated nodes by merging resources of released allocations with a range of free resources. Additionally, in certain embodiments, the resource allocator assigns all inactive allocations to be allocation heads. In certain embodiments, resource allocator uses the information of the linked list specifying a next or previous nodes for the plurality of nodes to allocate nodes and release allocated nodes.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system comprising:
   a plurality of hardware resources;
   one or more processors configured to execute one or more programs to perform one or more operations; and
   a resource allocator configured to implement resource allocation of the plurality of hardware resources to a set of hardware threads that are linked together in one or more nodes among a plurality of nodes by:
      implementing a list comprising the plurality of nodes that are linked in a predetermined order, wherein each of the plurality of nodes includes respective information regarding at least one of a next node or a previous node;
      allocating in a first order one or more ranges of free resources of the plurality of hardware resources to the one or more nodes of the plurality of nodes; and
      releasing allocated nodes in a second order distinct from the first order, wherein the first order and the second order are defined with respect to the predetermined order in which the nodes are linked,
   wherein the resource allocator is further configured to select a number of allocation heads based on a maximum number of nodes to which free resources can be allocated, and
   wherein the allocation heads correspond to respective contiguous ranges of free resources of the plurality of hardware resources.

2. The system as set forth in claim 1, wherein the resource allocator is configured to select a first range, from the one or more contiguous ranges of free resources, to allocate to a first node of the one or more nodes based on a request for resources.

3. The system as set forth in claim 2, wherein the selection is based on metadata of the request.

4. The system as set forth in claim 2, wherein the resource allocator selects the first range by selecting a range having an amount of free resources closest to an amount of the requested resources.

5. The system as set forth in claim 2, wherein the resource allocator selects the first range by selecting a range having an amount of free resources within a predefined margin of an amount of the requested resources.

6. The system as set forth in claim 1, wherein the resource allocator is configured to select a first range, from the one or more contiguous ranges of free resources, to allocate to a first node of the one or more nodes, wherein the resource allocator selects the first range by selecting a range having a greatest amount of free resources.

7. The system as set forth in claim 1, wherein the resource allocator is configured to release nodes out-of-order by remapping the plurality of hardware resources to one of:
   a previous allocated node;
   a next allocated node; or
   an allocation head having fewer resources.

8. The system as set forth in claim 1, wherein the resource allocator releases the allocated nodes by merging resources of released allocations with a range of free resources.

9. The system as set forth in claim 1, wherein at least one of:
   allocating in the first order comprises allocating in a first order one or more contiguous ranges of free resources of the plurality of hardware resources to one or more nodes of the plurality of nodes; or
   allocating in the first order comprises allocating the one or more ranges of free resources to one or more sets of threads being executed by the one or more processors.

10. A method comprising:
    implementing, in a system comprising a plurality of hardware resources and one or more processors configured to execute one or more programs to perform one or more operations, a list comprising a plurality of nodes that are linked in a predetermined order, wherein each of the plurality of nodes includes respective information regarding at least one node or a previous node;
    allocating in a first order one or more ranges of free resources of the plurality of hardware resources to one or more nodes of the plurality of nodes;
    releasing allocated nodes in a second order distinct from the first order, wherein the first order and the second order are defined with respect to the predetermined order in which the nodes are linked; and
    selecting a number of allocation heads based on a maximum number of nodes to which free resources can be allocated, wherein the allocation heads correspond to respective contiguous ranges of free resources of the plurality of hardware resources.

11. The method as set forth in claim 10, further comprising selecting a first range, from the one or more contiguous ranges of free resources, to allocate a first node of the one or more nodes based on a request for resources, wherein selecting the first range comprises one or more of:
    selecting the range based on metadata of the request;
    selecting a range having an amount of free resources closest to an amount of the requested resources;
    selecting a range having an amount of free resources within a predefined margin of an amount of the requested resources; or
    selecting a range having a greatest amount of free resources.

12. The method as set forth in claim 10, further comprising at least one of:
    assigning any inactive allocations as allocation heads;
    releasing the allocated nodes by merging resources of released allocations with a range of free resources; or
    using the information of the list specifying a next or previous nodes for the plurality of nodes to allocate nodes and release allocated nodes.

13. The method as set forth in claim 10, wherein releasing comprises remapping the plurality of hardware resources to one of:
    a previous allocated node;
    a next allocated node;
    an allocation head having fewer resources.

14. A non-transitory computer readable medium comprising a plurality of instructions that, when executed by one or more processors, is configured to implement, in a system comprising a plurality of hardware resources and one or more processors configured to execute one or more programs to perform one or more operations, resource allocation of a plurality of hardware resources to the one or more processors by:
    implementing a list comprising a plurality of nodes that are linked in a predetermined order, wherein each of the plurality of nodes includes respective information regarding at least one of a next node or a previous node;
    allocating in a first order one or more ranges of free resources of the plurality of hardware resources to one or more nodes of the plurality of nodes;
    releasing allocated nodes in a second order distinct from the first order, wherein the first order and the second order are defined with respect to the predetermined order in which the nodes are linked; and
    selecting a number of allocation heads based on a maximum number of nodes to which free resources can be allocated, wherein the allocation heads correspond to respective contiguous ranges of free resources of the plurality of hardware resources.

15. The non-transitory computer readable medium as set forth in claim 14, wherein the plurality of instructions is configured to cause the one or more processors to select a first range, from the one or more contiguous ranges of free resources, to allocate a first node of the one or more nodes based on a request for resources, wherein selecting the first range comprises one of:
    selecting the range based on a metadata of the request;
    selecting a range having an amount of free resources closest to an amount of the requested resources;
    selecting a range having an amount of free resources within a predefined margin of an amount of the requested resources; or
    selecting a range having a greatest amount of free resources.

16. The non-transitory computer readable medium as set claim 14, wherein the plurality of instructions is configured to cause the one or more processors to:
    assign any inactive allocations as allocation heads;
    release the allocated nodes by merging resources of released allocations with a range of free resources; or
    use the information of the list specifying a next or previous nodes for the plurality of nodes to allocate nodes and release allocated nodes.

17. The non-transitory computer readable medium as set forth in claim 14, wherein the plurality of instructions is configured to cause the one or more processors to release nodes out-of-order by remapping the plurality of hardware resources to one of:
    a previous allocated node;
    a next allocated node;
    an allocation head having fewer resources.

* * * * *